(12) United States Patent
Jalkanen et al.

(10) Patent No.: US 10,897,696 B2
(45) Date of Patent: Jan. 19, 2021

(54) EMERGENCY MESSAGING

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/788,332

(22) Filed: Feb. 12, 2020

(65) Prior Publication Data

US 2020/0267525 A1 Aug. 20, 2020

(30) Foreign Application Priority Data

Feb. 19, 2019 (EP) .................................... 19157986

(51) Int. Cl.
*H04M 11/04* (2006.01)
*H04W 4/90* (2018.01)
*H04L 12/58* (2006.01)
*H04W 4/20* (2018.01)

(52) U.S. Cl.
CPC ............... *H04W 4/90* (2018.02); *H04L 51/08* (2013.01); *H04W 4/20* (2013.01)

(58) Field of Classification Search
CPC ....... H04W 4/90; H04W 4/20; H04W 84/042; H04W 76/50; H04W 4/12; H04W 4/14; H04W 4/70; H04L 51/08; H04M 1/72536

USPC ....................................................... 455/404.1
See application file for complete search history.

(56) References Cited

U.S. PATENT DOCUMENTS

2020/0100291 A1* 3/2020 Ravishankar ..... H04W 74/0833

OTHER PUBLICATIONS

Slovetskiy et al., "Managing Non-IP Devices in Cellular IoT Networks", White Paper, Lighweight M2M 1.1, Oct. 2018.
(Continued)

*Primary Examiner* — Amancio Gonzalez
(74) *Attorney, Agent, or Firm* — Nixon & Vanderhye

(57) ABSTRACT

Disclosed are methods of a communication device and a network management entity for handling an emergency notification. The method of the communication device includes: generating an attach request to a network management entity requesting an attachment to a communication channel implementing Non-IP Data Delivery functionality; receiving a response to the attach request; in response to a detection that the response to the attach request indicates an acceptance of the attachment generating the emergency notification; and transmitting the generated emergency notification over the communication channel implementing Non-IP Data Delivery functionality. Also disclosed are a communication device, a network management entity, computer program products and a system.

20 Claims, 5 Drawing Sheets

(56) References Cited

OTHER PUBLICATIONS

3rd Generation Partnership Project; Technical Specification Group Services and System Aspects; Architecture enhancements to facilitate communications with packet data networks and applications (Release 16), 3GPP TS 23.68. V16.2.0 (Dec. 2018).
3rd Generation partnership Project; Technical Specification Group Services and System Aspects; General packet Radio Service (GPRS) enhancements for Evolved Universal Terrestrial Radio Access Network (E-UTRAN) access (Release 16), 3GPP TS 23.401 V16.1.0 (Dec. 2018).
Emtel; "Study of use cases and communications involving IoT devices in provision of emergency situations", D-ETSI TR 103 582 V0.4.0 (Jan. 2019).
"Protect & Track Cellular Panic Button & GPS Locator", Mivatek Smart Connect, www.mivatek.com.
'NON IP Data delivery (NIDD), http://docs.iot.t-mobile.nl/docs/non-ip-data delivery-nidd.

\* cited by examiner

EMERGENCY MESSAGING

TECHNICAL FIELD

The invention concerns in general the technical field of telecommunications. More particularly, the invention concerns messaging solution.

BACKGROUND

In emergency situations persons being involved in the situation in one way or another need a way to establish a communication connection to an authority. In many countries there is arranged a dedicated emergency number to be used in the emergency situations. Thus, when a person dials the dedicated emergency number with his/her communication device the call connection is typically established to an emergency call center through which a correct authority, such as police, an ambulance, fire brigade, or any similar, may be reached. Naturally, there may be separate emergency numbers individually to each authority.

The above described arrangement of the emergency number has a benefit that the call may be established in any network globally without any subscription or roaming agreement needed in the network in question, and additionally the emergency call is prioritized over normal calls.

Further, there is also introduced solutions in which the emergence notification may be given by using short message service (SMS) over a mobile communication network. These solutions may be applicable in a situation that the person is unable to speak for one reason or another. However, a drawback of these solutions is that the existing SMS based messaging solutions for emergency situations utilize proprietary network feature for conveying the notification which means that the emergency messages are not managed in any specific way by the communication network. Hence, a delivery of the messages may be delayed, and in emergency situation this may have serious consequences.

Thus, there is need to develop further solutions which, at least in part, mitigate the drawbacks discussed above and provide a sophisticated solution for generating an emergency notification through messaging.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present solutions for managing a messaging relating to an emergency situation.

The objectives of the invention are reached by methods, apparatuses, computer program products and a system as defined by the respective independent claims.

According to a first aspect, a method for generating an emergency notification by a communication device is provided, the method comprises: generating, in response to a detection of a request to generate the emergency notification, an attach request to a network management entity, the attach request carrying information indicating that an attachment is requested to a communication channel implementing Non-IP Data Delivery functionality and information representing that the attachment is requested for delivering an emergency notification; receiving a response to the attach request; in response to a detection that the response to the attach request indicates an acceptance of the attachment generating the emergency notification; and transmitting the generated emergency notification over the communication channel implementing Non-IP Data Delivery functionality.

The method may further comprise: in response to the detection that the response indicates the acceptance of the attachment communicating, by the communication device, with an external device for obtaining further data to be included in the emergency notification. Obtained further data may be at least one of the following: personal data relating to a user of the communication device; measurement data obtainable from at least one sensor.

According to a second aspect, a communication device for generating an emergency notification is provided, the communication device comprising: at least one processor; at least one memory including computer program code; the at least one memory and the computer program code configured to, with the at least one processor, cause the communication device to perform: generate, in response to a detection of a request to generate the emergency notification, an attach request to a network management entity, the attach request carrying information indicating that an attachment is requested to a communication channel implementing Non-IP Data Delivery functionality and information representing that the attachment is requested for delivering an emergency notification; receive a response to the attach request; in response to a detection that the response to the attach request indicates an acceptance of the attachment generate the emergency notification; and transmit the generated emergency notification over the communication channel implementing Non-IP Data Delivery functionality.

The communication device may further be caused to perform: communicate, in response to the detection that the response indicates the acceptance of the attachment, with an external device for obtaining further data to be included in the emergency notification. Obtained further data may be at least one of the following: personal data relating to a user of the communication device; measurement data obtainable from at least one sensor.

According to a third aspect, a computer program product for generating an emergency notification is provided, which computer program product, when executed by at least one processor, cause a communication device to perform the method as described above in the context of the first aspect.

According to a fourth aspect, a method for generating a signal indicating an emergency situation by a network management entity is provided, the method comprises: receiving an attach request from a communication device; in response to a detection that the attach request carries information indicating that an attachment is requested to a communication channel implementing Non-IP Data Delivery functionality and information representing that the attachment is requested for delivering an emergency notification allocating a network node controlling the communication channel implementing Non-IP Data Delivery functionality to the attach request; in response to an allocation of the network node generating a response to the communication device indicating an acceptance of an attachment; receiving an emergency notification over the communication channel implementing Non-IP Data Delivery functionality; and generating a signal indicating the emergency situation to the network node allocated to the attach request to be delivered to an emergency service center.

The method may further comprise: in response to a receipt of the emergency notification detecting that the emergency notification carries further data to be transmitted to the emergency service center. The method may further comprise: adding the further data in a signal for transmitting it from the network management entity to the network node.

Moreover, the method may further comprise: in response to the detection that the attach request carries information representing that the attachment is requested for delivering an emergency notification setting an indication expressing a priority to a signal for causing the network node to operate in accordance with the emergency situation.

According to a fifth aspect, a network management entity for generating a signal indicating an emergency situation is provided, the network management entity comprises: at least one processor; at least one memory including computer program code; the at least one memory and the computer program code configured to, with the at least one processor, cause the network management entity to perform: receive an attach request from a communication device; in response to a detection that the attach request carries information indicating that an attachment is requested to a communication channel implementing Non-IP Data Delivery functionality and information representing that the attachment is requested for delivering an emergency notification allocate a network node controlling the communication channel implementing Non-IP Data Delivery functionality to the attach request; in response to an allocation of the network node generate a response to the communication device indicating an acceptance of an attachment; receive an emergency notification over the communication channel implementing Non-IP Data Delivery functionality; and generate a signal indicating the emergency situation to the network node allocated to the attach request to be delivered to an emergency service center.

The network management entity may further be caused to perform: detect, in response to a receipt of the emergency notification, that the emergency notification carries further data to be transmitted to the emergency service center. The network management entity may further be caused to perform: add the further data in a signal for transmitting it from the network management entity to the network node.

Moreover, the network management entity may further be caused to perform: set, in response to the detection that the attach request carries information representing that the attachment is requested for delivering an emergency notification, an indication expressing a priority to a signal for causing the network node to operate in accordance with the emergency situation.

According to a sixth aspect, a computer program product for generating a signal indicating an emergency situation is provided, which computer program product, when executed by at least one processor, cause a network management entity to perform the method as described above in the context of the fourth aspect.

According to a seventh aspect, a system is provided, the system comprising: at least one communication device as described above in the context of the second aspect; a network management entity as described above in the context of the fifth aspect; a network node and an emergency service center.

Furthermore, the network node in the system may be implemented, for establishing a Non-IP Data Delivery functionality, with one of the following: Service Capability Exposure Function, SCEF; or Serving Gateway, SGW, and Packet Data Network Gateway, PGW.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an example of a communication environment in which at least some embodiments of the present invention for enabling a communication in an emergency situation may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
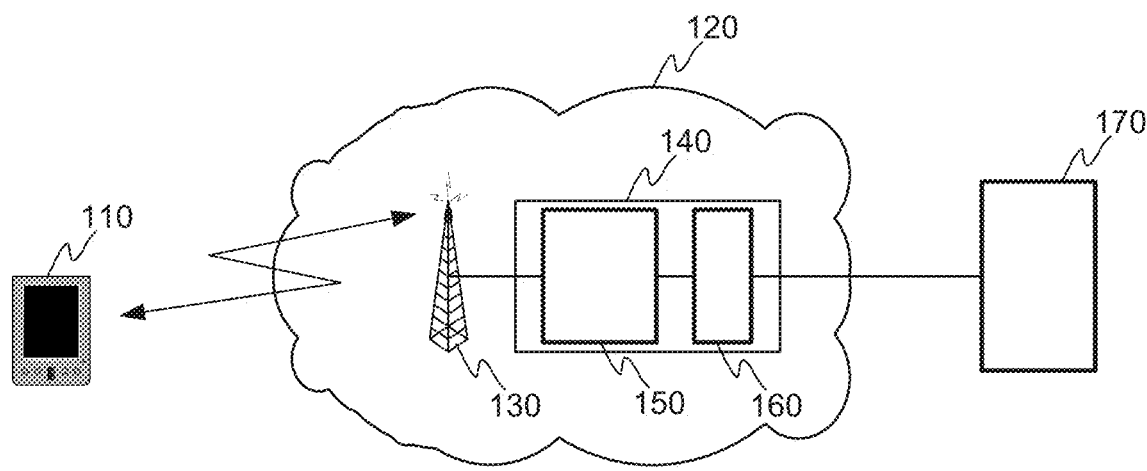

FIG. 1 illustrates schematically an example of a communication environment in which at least some embodiments of the present invention for enabling a communication in an emergency situation may be implemented to. A communication device 110 accessible to a user may be arranged to communicate with a communication network 120. The communication network 120 may e.g. comprise a radio access network 130 and a core network 140. The core network may comprise, among other entities, a network management entity 150, such as a Mobility Management Entity (MME), and further network nodes 160 configured to perform a certain task in the network, and especially for implementing at least a portion of the present invention as will be described. The mentioned network nodes 160 may alternatively, or in addition, reside external to the core network 140. According to an embodiment of the present invention the communication device 110 may be arranged to communicate with an emergency call center 170 as will be described. The emergency call center 170 may comprise necessary systems and devices, such as server devices and computing devices, for enabling the communication as will be described. For sake of clarity the communication device 110 accessible to the user may e.g. refer to a mobile terminal, such as a mobile phone, or to a dedicated communication device for indicating emergency situation as will be described, such as a so-called IoT device. For example, the communication device 110 may be installed in a location the user resides in a fixed manner or in a mobile manner.

Figure 2:
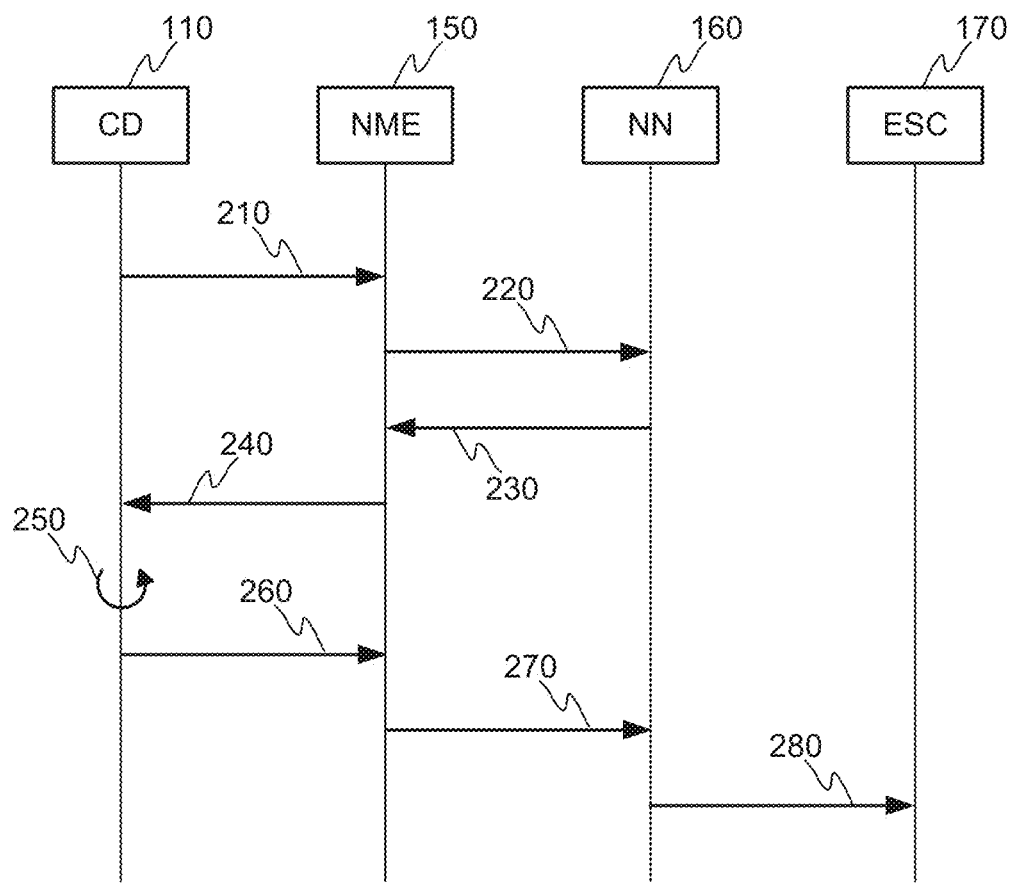
FIG. 2 illustrates schematically some aspects according to an embodiment of the invention as a flow chart.

Next, the invention is described, at least in part, by referring to FIG. 2 schematically illustrating at least some aspects of the present invention as a flow chart. First, a user may request of a generation of an emergency notification with an applicable input to the communication device 110. The indication may e.g. be an interaction with input/output devices of the communication device 110, such as pushing a button. In response to a detection of the request the communication device 110 may be arranged to generate an attach request towards a communication network 120. More specifically, the attach request 210 is directed to a network management entity 150, such as MME, arranged at least in part to manage the attach requests in the communication network 120. According to an embodiment of the invention the attach request 210 generated by the communication device 110 may carry information indicating that an attachment is requested to a communication channel implementing Non-IP Data Delivery functionality. In addition to the information indicating that an attachment is requested to a communication channel implementing Non-IP Data Delivery functionality the attach request 210 may carry information indicating that the attachment is requested for delivering an emergency notification. For example, there may be arranged a specific data field in the attach request 210 into which it is included an applicable identifier, such as a flag, for indicating that the attach request 210 relates to an emergency situation. An advantage of this kind of implementation is that the attachment may be performed to any communication network since the emergency situation is indicated in the attach request 210, if agreed between operators of the communication networks available in an area.

The network management entity 150 receives the attach request 210 and the network management entity 150 may be arranged to detect mentioned pieces of information from the received attach request 210. In response to the detection the network management entity 150 may be arranged to allocate a network node 160 to the attach request 210. The network node 160 may at least be arranged to control the communication channel implementing Non-IP Data Delivery functionality. The controlling may e.g. refer to establishing and managing a communication channel with a service the network node 160 is configured to implement to. As mentioned, the network management entity 150 may be arranged to allocate the network node 160 for a communication in accordance with the information carried in the attach request 210. The allocation may comprise, among other items, a generation of a signal 220 to the network node 160. The network node 160 to which the signal 220 is generated may be determined by the network management entity 150 in accordance with the information received in the attach request 210. For example, in response to a detection that the attach request 210 carries the indication on the emergency situation the network management entity 150 may inquire, e.g. from a memory accessible to it, a network node 160 arranged to serve in a communication relating to the emergency situation. In response to the determination of the network node 160 for the task the signal 220 is generated wherein the signal may carry an information that the communication device 110 requests communication service and it is to be attached to the network node 160. The signal 220 may carry information, such as an identifier of the communication device 110 or the session initiated by the communication device 110, to the network node 160. The network node 160 may be arranged to indicate an acceptance of the attach to the network management node 150 with the signal 230. Further, the network management entity 150 may be arranged to generate an acknowledgement signal 240 to the communication device 110 for indicating that the attachment as requested is accepted. In response to a detection by the communication device that the attach request is accepted the communication device 110 may be arranged to generate 250 an emergency notification. The generation of the emergency notification 250 may comprise, but is not limited to, a formatting a message complying a message format conveyable over the communication channel implementing Non-IP Data Delivery functionality. Additionally, the message representing the emergency notification may be formatted so that predetermined piece or pieces of information is included in the message, such as in the payload of the message. According to an embodiment of the invention the piece of information to be included in the message may at least comprise data by means of which a location of the communication device 110 may be determined. The data representing the location may e.g. be GPS coordinates or any other data by means of which the location of the communication device 110 may be determined. Naturally, the communication device 110 is such that it is suitable for providing the data from which the location may be derived. Alternatively or in addition, the communication device 110 may be configured to include further data obtainable from a memory device accessible to the communication device 110 in the message representing the emergency notification. Such information may e.g. be personal data representing a user of the communication device 110. An advantage of such an arrangement is that the person who initiated the generation of the emergency notification may provide information on himself/herself to an emergency call center without verbal communication and the person taking care of the emergency call may obtain information about the person from suitable databases, such as databases storing health information. This may be utilized in a preparation of the intervention to the emergency situation. In response to the generation of the emergency notification it may be transmitted to the network management entity 150 with a signal 260. The signal 260 may advantageously be transmitted over non-access stratum (NAS) layer, by utilizing the Non-IP Data functionality, from the communication device 110 to the network management entity 150. In response to the receipt of the emergency notification the network management entity 150 may be arranged to generate a signal 270 representing the emergency notification, e.g. by forwarding it as such or by modifying it according to a need, to the network node 160. The network node 160 supporting the messaging as described may detect that the signal 270 carries the emergency notification and it may be arranged to convey the signal, as such or by modifying it according to a need, to an emergency call center 170. This is indicated with a signal 280 in FIG. 2.

According to an embodiment of the invention a communication relating to an emergency situation may be managed with high priority in the communication network 120. For example, it may be arranged that an attach request 210 carries an indication, such as a data record, representing a priority of the service requested with the attach request 210. The indication may be detected by the network management entity 150 and the process may be continued, at least in part, in accordance with the priority. Alternatively or in addition, the network management entity 150 may be arranged to detect that the received attach request relates to an emergency situation and set an indication expressing that to the signal 220 in order to cause the network node 160, and any other entity, to operate in accordance with the emergency situation. For example, it may be arranged that in response to the detection that the signaling in the communication network 120 relates to an emergency situation it may be arranged that any signaling, such as a signal and any response relating to the signal, shall be managed with high priority in the communication network 120. This may refer to an implementation in which such signaling is handled prior to other signaling without the priority, for example.

Figure 3:
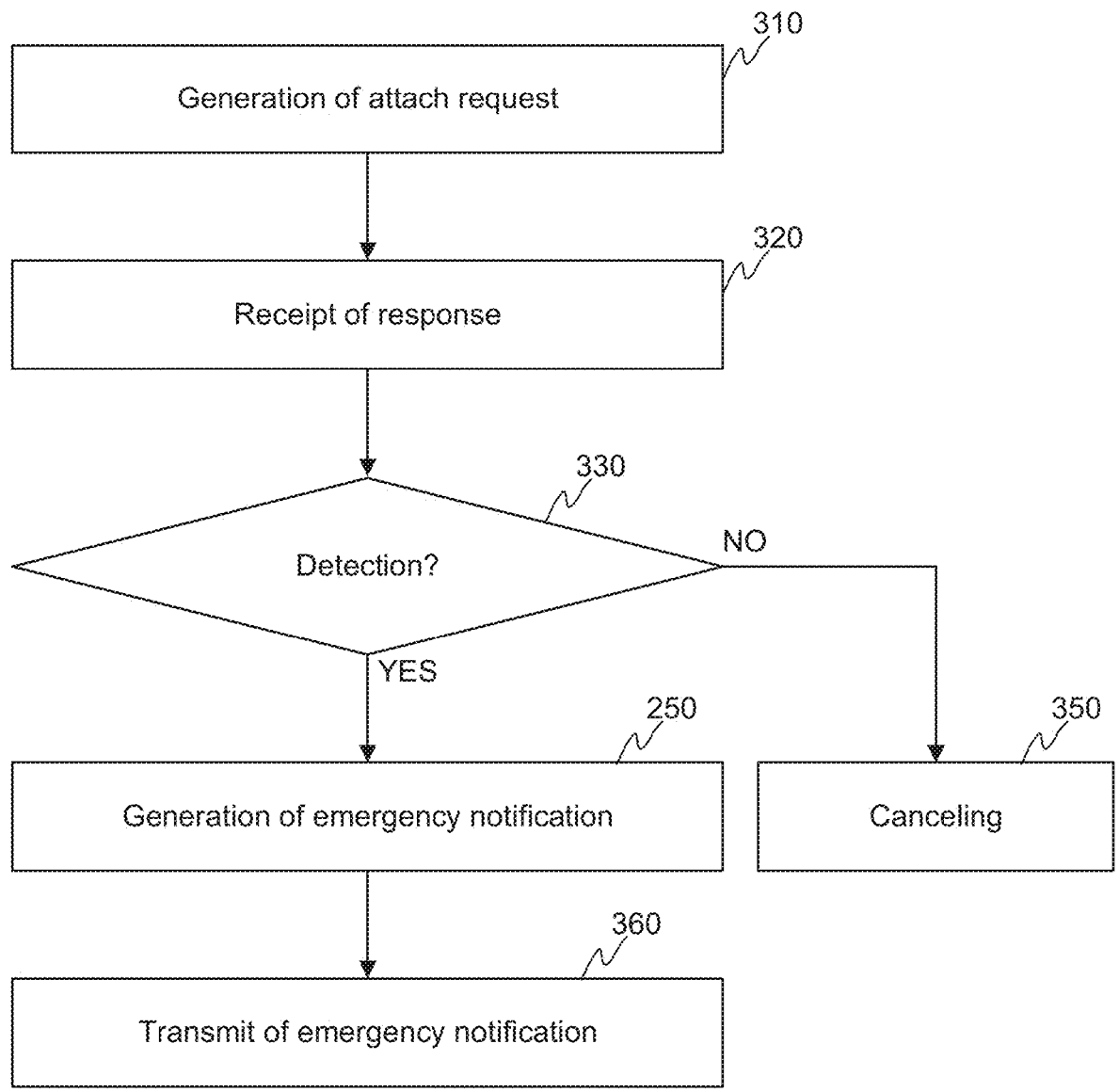
FIG. 3 illustrates schematically an example of a method according to an embodiment of the invention implemented by a communication device.

Next, it is referred to FIG. 3 in which at least some aspects of an operation according to an embodiment of the invention are schematically illustrated from a communication device 110 point of view. As discussed, the communication device 110 may be arranged to generate 310 an attach request 210 in response to a predetermined interaction between the communication device 110 and a user, or even automatically in response to a detection of a predetermined event, e.g. based on information obtainable with one or more sensors accessible by the communication device 110. The attach request may, as discussed, at least carry information indicating that an attachment is requested to a communication channel implementing Non-IP Data Delivery functionality and information representing that the attachment is requested for delivering an emergency notification. In response to the generation of the attach request 210 to a network management entity 150 the network management entity 150 may be arranged to perform its operations and to generate a response 240 which is received 320 by the communication device 110. Next, the communication device 110 may be arranged to detect 330 if the response 240 to the attach request 210 indicates an acceptance of the attachment generating the emergency notification or not. If this is not the case the whole process may be canceled 350. According to an embodiment of the invention the cancellation of the process may be indicated to user. On the other hand, if the detection 330 indicates that the attachment is accepted by the network management entity 150, and by any other network element, such as the network node 160, the communication device 110 may be arranged to generate 250 an emergency notification and transmit 360 the generated emergency notification over the communication channel implementing Non-IP Data Delivery functionality.

Figure 4:
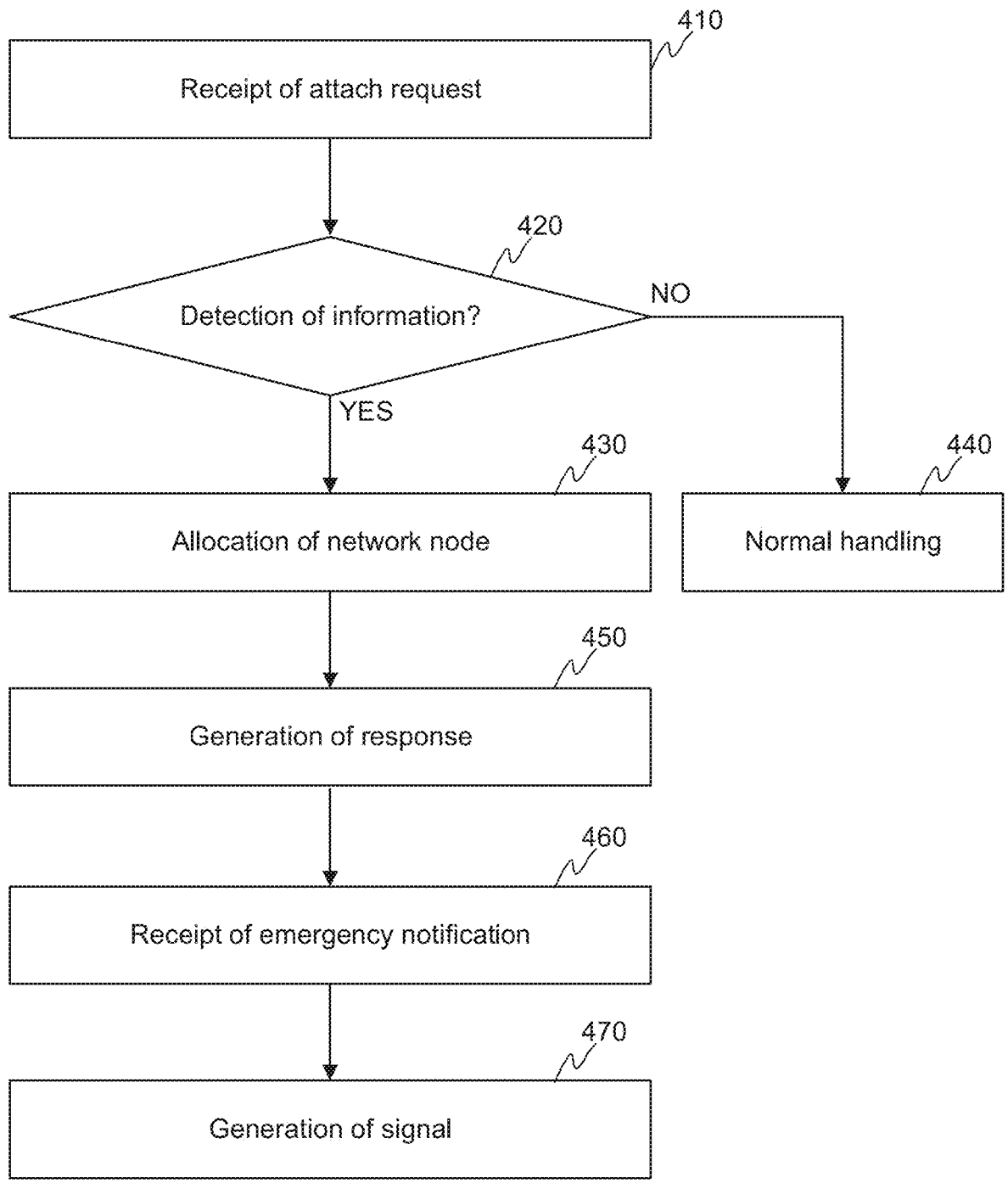
FIG. 4 illustrates schematically an example of a method according to an embodiment of the invention implemented by a network management entity.

Correspondingly, FIG. 4 illustrates schematically at least some aspects of an operation according to an embodiment of the invention from a network management entity 150 point of view. There, the network management entity 150 may receive 410 the attach request 210 from the communication device 110. The network management entity may be arranged to process the data and detect information 420 carried in the attach request 210. In response to a detection that the attach request 210 carries information indicating that an attachment is requested to a communication channel implementing Non-IP Data Delivery functionality and information representing that the attachment is requested for delivering an emergency notification the network management entity 150 may be arranged to allocate 430 a network node 160, which controls the communication channel implementing Non-IP Data Delivery functionality, to the attach request. On the other hand, if an outcome of the detection 420 is that the attach request does not carry the information causing the detection the network management entity 150 may be arranged to handle 440 the received attach request in a normal manner i.e. not as a signaling related to an emergency situation. For example, the signaling may not be assigned with a high priority. Now, if the network node 160 is allocated to the attach request 210 for implementing at least a part of the communication over Non-IP Data Delivery functionality, the network management entity 150 may be arranged to generate 450 a response 240 to the communication device 110 for indicating an acceptance of an attachment. Next, the network management node 150 may receive 460 an emergency notification 260 from the communication device 110 over the communication channel implementing Non-IP Data Delivery functionality. In response to the receipt of it, the network management entity 150 may be arranged to generate 470 a signal 270 for indicating the emergency situation to the network node 160, which indication is to be delivered to an emergency service center 170 by the network node 160. In case the emergency notification 260 carries further information the network management node 150 may be arranged to include it to a signal 270 as such or by modifying it in some manner.

The invention as described above is based, at least in part, to a communication between a network management entity 150 and a network node 160. A non-limiting example of the network management entity 150 is a Mobility Management Entity implementing control functions among other tasks in LTE networks. The network node 160 suitable for implementing the Non-IP Data Delivery functionality may e.g. be so-called SCEF (Service Capability Exposure Function) which may provide machine type communication interworking functions for the purpose of the present invention. Alternatively, the network node 160 may consists of a plurality of network elements, such as SGW (Serving Gateway) element and PGW (Packet Data Network Gateway), by means of which the Non-IP Data Delivery functionality may be implemented to.

Furthermore, the communication with respect to the emergency situation may require a communication channel that is secure to use e.g. because the data carried in the emergency notification may be private but also because it is important that $3^{rd}$ parties may not access the data carried in the emergency notification. An applicable communication channel to be used for the purpose of the present invention may be so-called BEST (Battery Efficient Security for Very Low Throughput MTC Devices). The BEST channel is a secure communication channel applicable for communication between a communication device 110 and a service entity in question, such as an emergency service center 170. An establishment of the BEST channel may comprise operations relating to session initiation and agreement on keys to be used for securing the communication channel, session key management, and so on.

Figure 5:
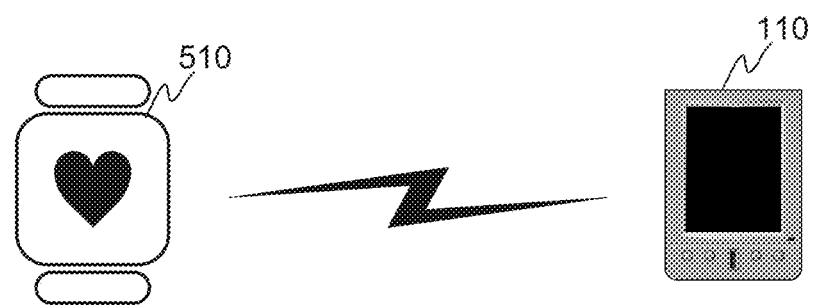
FIG. 5 illustrates schematically an aspect according to an embodiment of the invention relating to a communication device.

As discussed above the emergency notification 260 may carry further information e.g. with respect to the person who initiated the generation of the emergency notification. According to an embodiment of the invention the communication device 110 may be arranged to obtain further data to be included in the emergency notification 260 from one or more external devices. FIG. 5 illustrates schematically a non-limiting example in which the communication device 110 may be communicatively coupled with a wireless communication or with a wired communication to a device 510 suitable for providing the data to be included in the emergency notification 260. The wireless communication may e.g. be implemented with a short-range wireless communication. For example, the device 510 may be a sensor with a communication capability which may measure heart rate of the person or blood pressure, blood sugar or any other measurable biological value, or any other value applicable in the context of the present invention. The obtaining of the data may e.g. be triggered so that the data is obtained in response to a receipt of a confirmation that the attachment is successful, for example. As mentioned, the device 510 may also refer to a memory accessible to the communication device 110 for obtaining data, such as personal data, to be included in the emergency notification 260.

In some embodiment of the invention the communication device 110 may be arranged to include a parameter in the emergency notification 260 which indicates that the system in the emergency service center shall perform a call-back to the communication device 110. This may e.g. be advantageous in a situation in which the communication device 110 may receive mobile terminated voice calls.

The communication in the above-described manner may be achieved by arranging dedicated network addresses to the communicating entities, which may be used in the communication between the communicating entities.

Figure 6:
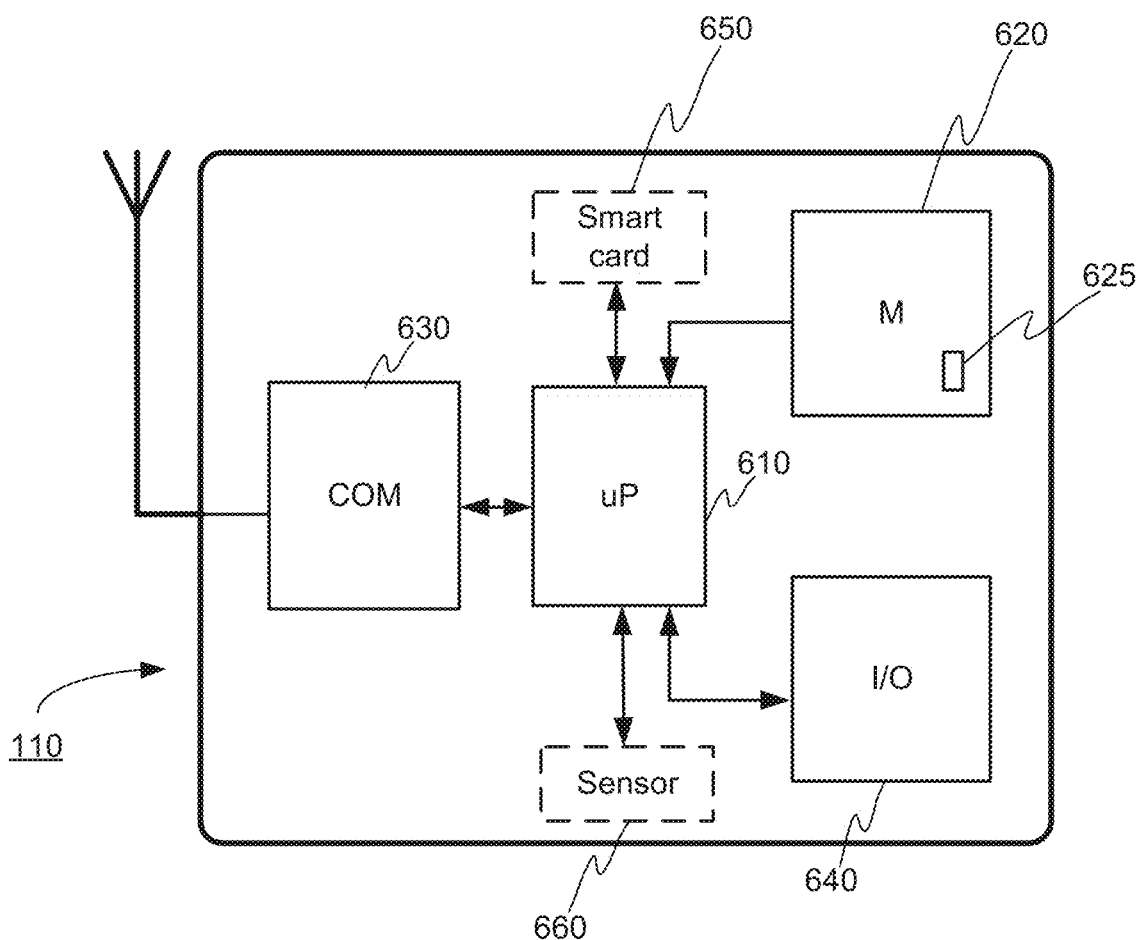
FIG. 6 illustrates schematically a communication device according to an embodiment of the invention.

FIG. 6 illustrates schematically a non-limiting example of a communication device 110 according to an embodiment of the invention. The communication device 110 may comprise at least one processor 610 arranged to control an operation of the terminal device 110. The communication device 110 may also comprise at least one memory 620, at least one communication interface 630 and one or more input/output devices 640 for inputting and outputting information. The memory 620 may be arranged to store computer program code 625, but also further data, such as parameter data and any other data e.g. obtained and generated by the communication device 110. Further, the communication device 110 may comprise a smart card 650 which may be needed e.g. for accessing to a communication network, such as to a mobile communication net-work. For example, the smart card may operate as a subscriber identity module (SIM) for the mobile communication network. Still further, the communication device 110 may comprise one or more sensors for obtaining measurement data. In some embodiment, the sensor 660 may obtain information for positioning the terminal device 110.

Figure 7:
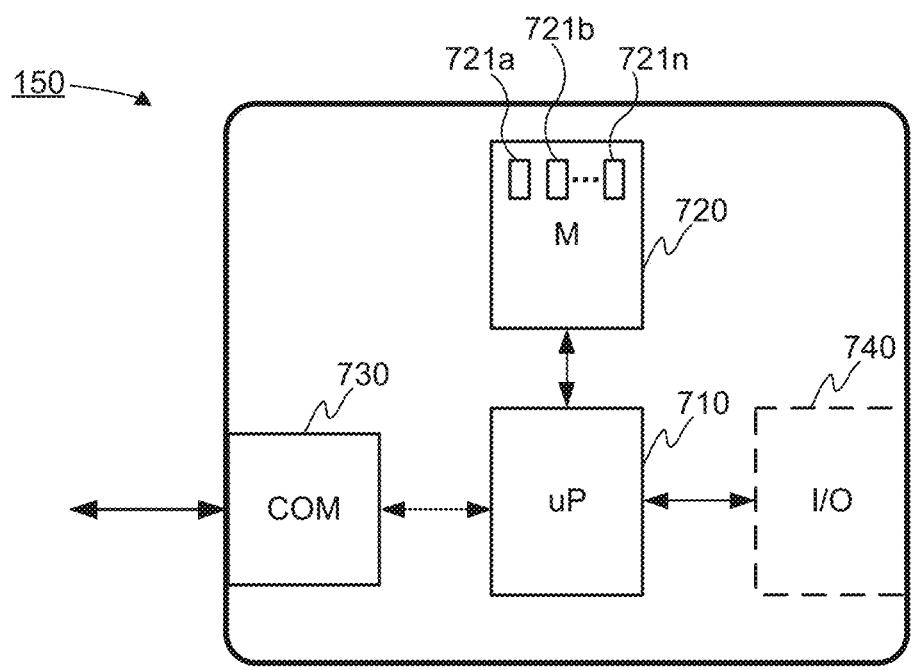
FIG. 7 illustrates schematically a network management entity according to an embodiment of the invention.

An example of a network management entity 150 according to an embodiment of the invention is schematically illustrated in FIG. 7. The network management entity 150 may be configured to implement at least part of the method relating to an emergency situation as described. The execution of the method, or at least some portions of it, may be achieved by arranging at least one processor 710 to execute at least some portion of computer program code 721a-721n stored in at least one memory 720 causing the processor 710, and, thus, the network management entity 150 to implement one or more method steps as described. In other words, the processor 710 may be arranged to access the memory 720 and to retrieve and to store any information therefrom and thereto. Moreover, the processor 710 may be configured to control a communication through one or more communication interfaces 730 for accessing one or more external entities over a communication network 120. Hence, the communication interface 730 may be arranged to implement, e.g. under control of the processor 710, one or more communication protocols for communicating with one or more entities. The term communication interface 730 shall be understood in a broad manner comprising necessary hardware and software elements, such as antenna(s) and/or TX/RX radio part(s) and/or modem(s), for implementing the communication techniques. Further, the network management entity 150 in question may comprise one or more input/output devices 740 for inputting and outputting information. Such input/output devices may e.g. be keyboard, buttons, touch screen, display, loudspeaker, microphone camera and so on. In some implementation of the network management entity 150 at least some of the input/output devices may be external to the network management entity 150 and be coupled to it either wirelessly or in a wired manner. For sake of clarity, the processor 710 herein refers to any unit or a plurality of units suitable for processing information and control the operation of the network management entity 150 in general at least in part, among other tasks. The mentioned operations may e.g. be implemented with a microcontroller solution with embedded software. Similarly, the invention is not limited to a certain type of memory 720, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus.

The network node 160 may be implemented with the same kind of structural elements as the network management entity 150. However, the network node 160 may be configured to implement a task as described for enabling the communication with the emergency service center 170 over the Non-IP Data Delivery functionality.

Some aspects of the present invention may relate to computer program products comprising respective computer-readable non-transitory media having respective computer program codes stored thereon which, when executed by at least one processor, cause the communication device 110, the network management entity 150 and the network node 160, correspondingly, to perform at least some portions of the method as described.

Still further, at least some of the entities as described may form a communication system in which an emergency situation may be communicated between the parties.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating an emergency notification by a communication device, the method comprises:
   generating, in response to a detection of a request to generate the emergency notification, an attach request to a network management entity, the attach request carrying information indicating that an attachment is requested to a communication channel implementing Non-IP Data Delivery functionality and information representing that the attachment is requested for delivering an emergency notification,
   receiving a response to the attach request,
   in response to a detection that the response to the attach request indicates an acceptance of the attachment generating the emergency notification, and
   transmitting the generated emergency notification over the communication channel implementing Non-IP Data Delivery functionality.

2. The method of claim 1, wherein the method further comprises:

in response to the detection that the response indicates the acceptance of the attachment communicating, by the communication device, with an external device for obtaining further data to be included in the emergency notification.

3. The method of the claim 2, wherein obtained further data is at least one of the following: personal data relating to a user of the communication device; measurement data obtainable from at least one sensor.

4. A non-transitory computer readable medium on which is stored a computer program for generating an emergency notification, which, when executed by at least one processor, cause a communication device to perform the method according to claim 3.

5. A non-transitory computer readable medium on which is stored a computer program for generating an emergency notification, which, when executed by at least one processor, cause a communication device to perform the method according to claim 2.

6. A non-transitory computer readable medium on which is stored a computer program for generating an emergency notification, which, when executed by at least one processor, cause a communication device to perform the method according to claim 1.

7. A communication device for generating an emergency notification, the communication device comprising:
   at least one processor;
   at least one memory including computer program code;
   the at least one memory and the computer program code configured to, with the at least one processor, cause the communication device to perform:
   generate, in response to a detection of a request to generate the emergency notification, an attach request to a network management entity, the attach request carrying information indicating that an attachment is requested to a communication channel implementing Non-IP Data Delivery functionality and information representing that the attachment is requested for delivering an emergency notification,
   receive a response to the attach request,
   in response to a detection that the response to the attach request indicates an acceptance of the attachment generate the emergency notification, and
   transmit the generated emergency notification over the communication channel implementing Non-IP Data Delivery functionality.

8. The communication device of claim 7, wherein the communication device is further caused to perform:
   communicate, in response to the detection that the response indicates the acceptance of the attachment, with an external device for obtaining further data to be included in the emergency notification.

9. The communication device of claim 8, wherein obtained further data is at least one of the following: personal data relating to a user of the communication device; measurement data obtainable from at least one sensor.

10. A method for generating a signal indicating an emergency situation by a network management entity, the method comprises:
    receiving an attach request from a communication device,
    in response to a detection that the attach request carries information indicating that an attachment is requested to a communication channel implementing Non-IP Data Delivery functionality and information representing that the attachment is requested for delivering an emergency notification allocating a network node controlling the communication channel implementing Non-IP Data Delivery functionality to the attach request,
    in response to an allocation of the network node generating a response to the communication device indicating an acceptance of an attachment,
    receiving an emergency notification over the communication channel implementing Non-IP Data Delivery functionality, and
    generating a signal indicating the emergency situation to the network node allocated to the attach request to be delivered to an emergency service center.

11. The method of claim 10, the method further comprises:
    in response to a receipt of the emergency notification detecting that the emergency notification carries further data to be transmitted to the emergency service center.

12. The method of claim 11, the method further comprises:
    adding the further data in a signal for transmitting it from the network management entity to the network node.

13. The method of claim 10, the method further comprises:
    in response to the detection that the attach request carries information representing that the attachment is requested for delivering an emergency notification setting an indication expressing a priority to a signal for causing the network node to operate in accordance with the emergency situation.

14. A non-transitory computer-readable medium on which is stored a computer program for generating a signal indicating an emergency situation, which, when executed by at least one processor, cause a network management entity to perform the method according to claim 10.

15. A network management entity for generating a signal indicating an emergency situation, the network management entity comprises:
    at least one processor;
    at least one memory including computer program code;
    the at least one memory and the computer program code configured to, with the at least one processor, cause the network management entity to perform:
    receive an attach request from a communication device,
    in response to a detection that the attach request carries information indicating that an attachment is requested to a communication channel implementing Non-IP Data Delivery functionality and information representing that the attachment is requested for delivering an emergency notification allocate a network node controlling the communication channel implementing Non-IP Data Delivery functionality to the attach request,
    in response to an allocation of the network node generate a response to the communication device indicating an acceptance of an attachment,
    receive an emergency notification over the communication channel implementing Non-IP Data Delivery functionality, and
    generate a signal indicating the emergency situation to the network node allocated to the attach request to be delivered to an emergency service center.

16. The network management entity of claim 15, wherein the network management entity is further caused to perform:
    detect, in response to a receipt of the emergency notification, that the emergency notification carries further data to be transmitted to the emergency service center.

17. The network management entity of claim 16, wherein the network management entity is further caused to perform:
add the further data in a signal for transmitting it from the network management entity to the network node.

18. The network management entity of claim 15, wherein the network management entity is further caused to perform:
set, in response to the detection that the attach request carries information representing that the attachment is requested for delivering an emergency notification, an indication expressing a priority to a signal for causing the network node to operate in accordance with the emergency situation.

19. A system, comprising:
at least one communication device for generating an emergency notification, the communication device comprising:
at least one processor;
at least one memory including computer program code;
the at least one memory and the computer program code configured to, with the at least one processor, cause the communication device to perform:
generate, in response to a detection of a request to generate the emergency notification, an attach request to a network management entity, the attach request carrying information indicating that an attachment is requested to a communication channel implementing Non-IP Data Delivery functionality and information representing that the attachment is requested for delivering an emergency notification,
receive a response to the attach request,
in response to a detection that the response to the attach request indicates an acceptance of the attachment generate the emergency notification, and
transmit the generated emergency notification over the communication channel implementing Non-IP Data Delivery functionality,
the network management entity of claim 15,
a network node, and
an emergency service center.

20. The system of claim 19, wherein the network node is implemented, for establishing a Non-IP Data Delivery functionality, with one of the following:
Service Capability Exposure Function, SCEF; or
Serving Gateway, SGW, and Packet Data Network Gateway, PGW.

* * * * *